(12) United States Patent
Fortin et al.

(10) Patent No.: US 7,560,788 B2
(45) Date of Patent: Jul. 14, 2009

(54) MICROELECTROMECHANICAL SYSTEM PRESSURE SENSOR AND METHOD FOR MAKING AND USING

(75) Inventors: Jeffrey Fortin, Niskayuna, NY (US); Guanghua (George) Wu, Dublin, CA (US); Kanakasabapathi Subramanian, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 348 days.

(21) Appl. No.: 10/945,399

(22) Filed: Sep. 20, 2004

(65) Prior Publication Data

US 2006/0063354 A1 Mar. 23, 2006

(51) Int. Cl.
*H01L 29/78* (2006.01)

(52) U.S. Cl. ............... 257/415; 257/417; 257/108; 438/50

(58) Field of Classification Search ............ 438/53, 438/396, 459; 257/108, 414, 415, 417
See application file for complete search history.

(56) References Cited

U.S. PATENT DOCUMENTS 5,706,565 A    1/1998  Sparks et al.
5,936,164 A *  8/1999  Sparks et al. .......... 73/724
6,145,384 A * 11/2000  Ikeda et al. ........... 73/780
6,465,271 B1* 10/2002  Ko et al. ............... 438/48
6,704,185 B2*  3/2004  Chatzandroulis et al. . 361/283.1

OTHER PUBLICATIONS

WEB document by Wikipedia.org about Capacitance ( 5 page ).*

* cited by examiner

*Primary Examiner*—Thinh T Nguyen
(74) *Attorney, Agent, or Firm*—Richard A. DeCristofaro

(57) ABSTRACT

According to some embodiments, a conducting layer is formed on a first wafer. An insulating layer is formed on a second wafer. The insulating layer includes a cavity and a conducting area may be formed in the second wafer proximate to the cavity. The side of the conducting layer opposite the first wafer is bonded to the side of the insulating layer opposite the second wafer. At least some of the first wafer is then removed, without removing at least some of the conducting layer, to form a conducting diaphragm that is substantially parallel to the second wafer. In this way, an amount of capacitance between the diaphragm and the conducting area may be measured to determine an amount of pressure being applied to the diaphragm.

11 Claims, 22 Drawing Sheets

MICROELECTROMECHANICAL SYSTEM PRESSURE SENSOR AND METHOD FOR MAKING AND USING

BACKGROUND

A pressure sensor may convert an amount of pressure into an electrical value. For example, a pressure sensor may include a diaphragm or membrane positioned over a well formed in a substrate. When the diaphragm and the bottom of the well are conductors and are electrically isolated from each other, an amount of pressure being applied to the diaphragm may be converted into a capacitance value. Creating such a sensor, however, can be a complex process (e.g., bulk micromachining might be used to form the well in a ceramic or glass substrate). Moreover, even small variations in the dimensions of the diaphragm or the well can reduce the accuracy and/or sensitivity of the sensor. In addition, parasitics associated with the sensing region may further degrade the sensor's performance.

SUMMARY

According to some embodiments, a conducting layer may be formed on a first wafer. An insulating layer may be formed on a second wafer, and the insulating layer may include a cavity. The side of the conducting layer opposite the first wafer may then be bonded to the side of the insulating layer opposite the second wafer. At least a portion of the first wafer may then be removed, without removing at least a portion of the conducting layer associated with the cavity, to form a diaphragm substantially parallel to the second wafer.

DETAILED DESCRIPTION

Figure 1:
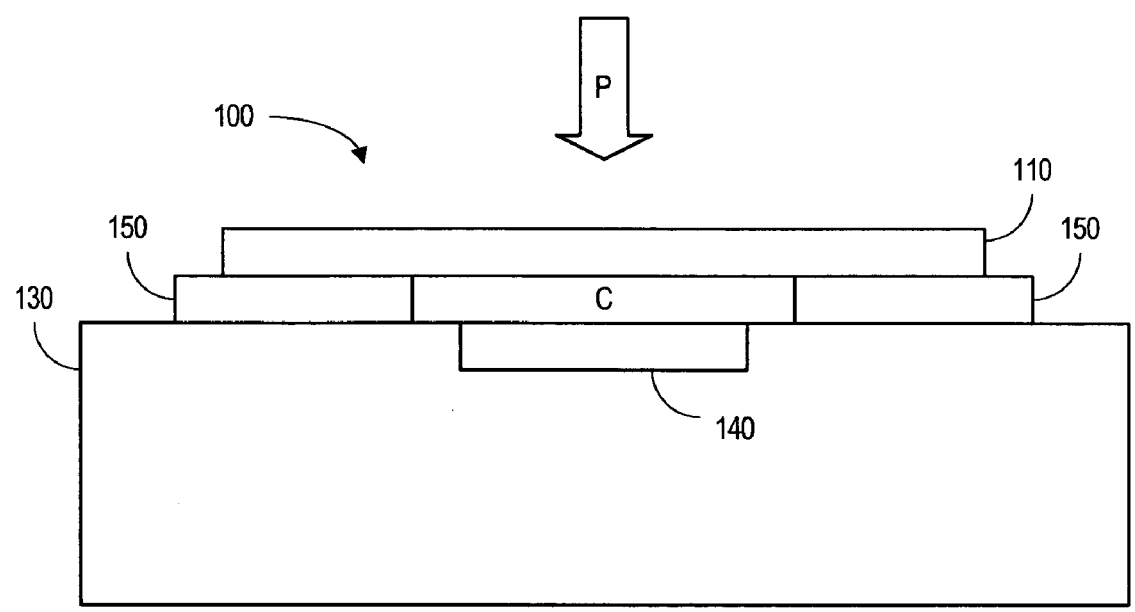
FIG. 1 is a side view of a pressure sensor in accordance with an exemplary embodiment of the invention.

FIG. 1 is a side view of a pressure sensor 100 in accordance with an exemplary embodiment of the invention. The sensor 100 may be, for example, a Microelectromechanical System (MEMS) device formed using a wafer 130, such as a wafer 130 of lightly doped silicon. The top surface of the wafer 130 may be a substantially flat surface that defines a plane, and an insulating layer 150 may be formed on that surface of the wafer 130. The insulating layer 150 may be, for example, a layer of oxide grown or deposited on the wafer 130. The insulating layer 150 includes a cavity C.

A conducting portion 140 may be formed in or on the wafer 130 in the area beneath the cavity C. The conducting portion 140 may be, for example, an area of highly doped silicon. The area of the conducting portion 140 may be smaller than, larger than, or equal to the area of the cavity C.

A conducting diaphragm 110 may be bonded to the insulating layer 150 over the cavity C. For example, the conducting diaphragm 110 may a thin, flexible membrane that covers the cavity C and that is substantially parallel to the plane defined by the surface of the wafer 130.

Figure 2:
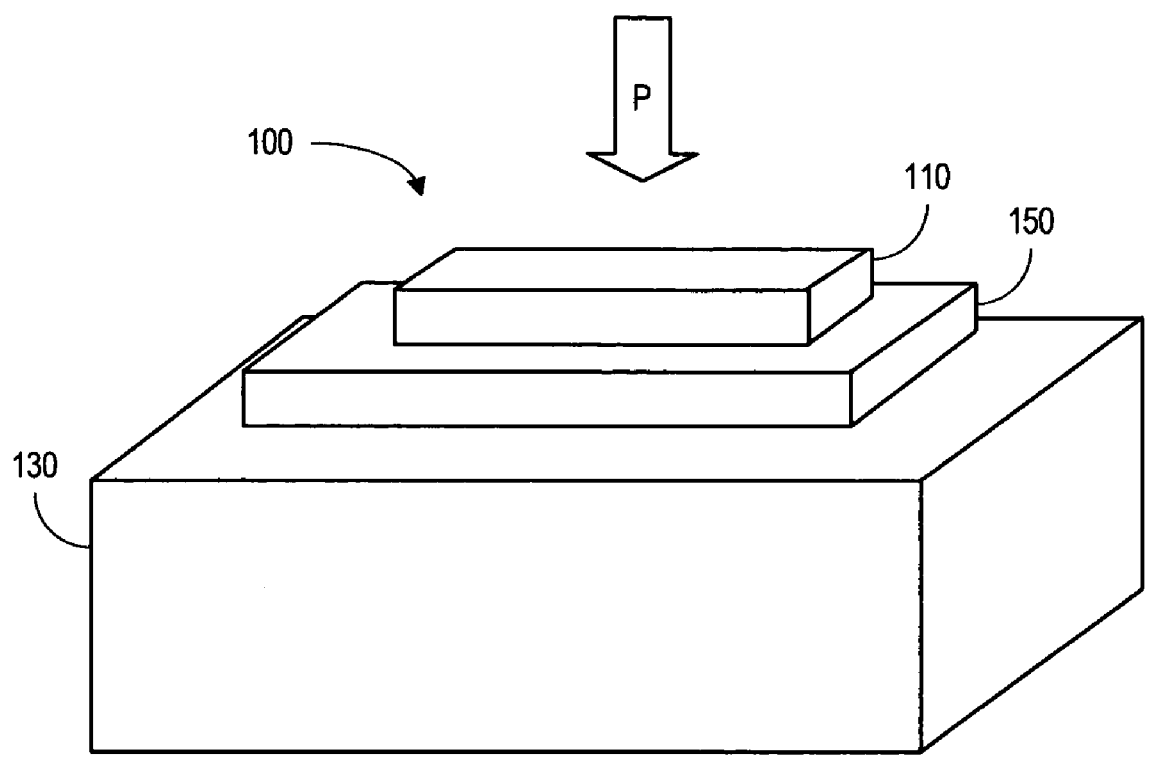
FIG. 2 is a perspective view of the pressure sensor of FIG. 1.

FIG. 2 is a perspective view of the pressure sensor 100 of FIG. 1. In particular, the conducting diaphragm 110 is attached to the insulating layer 150, which in turn is attached to the wafer 130 to form the cavity C (not illustrated in FIG. 2). In this way, the conducting diaphragm 110 may be electrically isolated from the conducting portion 140 of the wafer 130 located below the cavity C. Although a rectangular conducting diaphragm 110, insulating layer 150, and wafer 130 are illustrated in FIG. 2, these elements may have any other type of shape (e.g., the conducting diaphragm 110 and insulating layer 150 may form a disc-shaped cavity).

Figure 3:
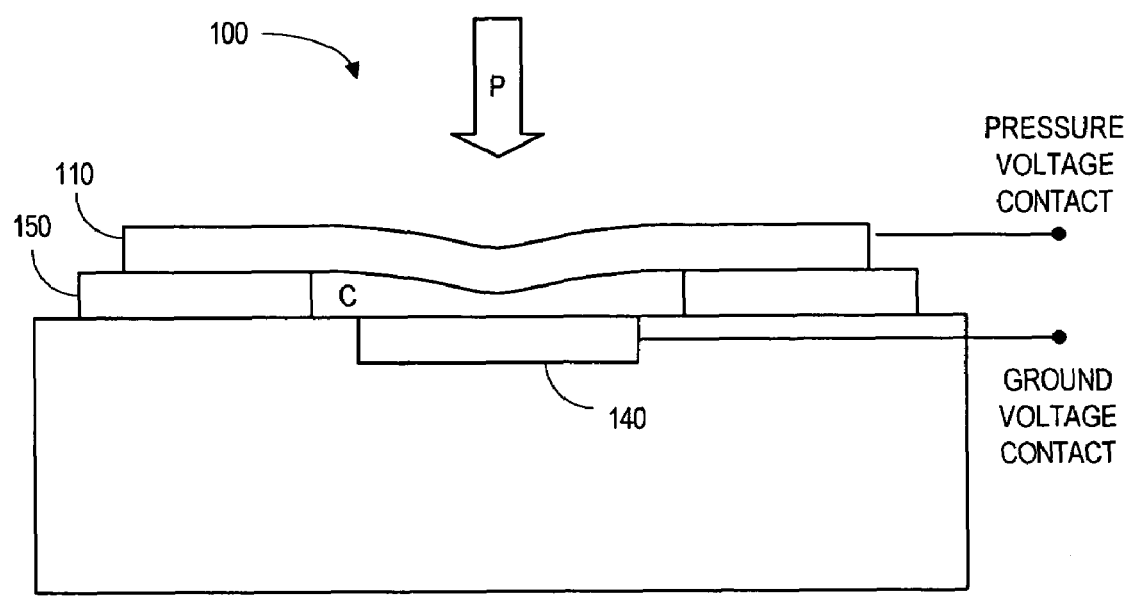
FIG. 3 is a side view of the pressure sensor of FIG. 1 when exposed to a pressure.

Note that the conducting diaphragm 110 may be deformable in a direction substantially normal to the plane defined by the surface of the wafer 130. For example, as illustrated in FIG. 3 the conducting diaphragm 110 may flex toward the conducting portion 140 in response to a pressure (P). That is, the distance between at least a portion of the conducting diaphragm 110 and the conducting portion 140 may decrease when the pressure P increases. Note that the conducting diaphragm 110 may include a non-conducting portions. For example, the conducting diaphragm 110 might be formed using an insulating material with a layer of metal deposited on top.

Note that a capacitance between the conducting diaphragm 110 and the conducting portion 140 depends in part on the distance between them. In particular, because the conducting diaphragm 110 and the conducting portion 140 are electrically isolated from each other, the capacitance between them will increase as they move closer to each other. An increase in the pressure P, therefore, can be measured based on the increased capacitance, since the increased pressure P will push at least a portion of the conducting diaphragm 110 closer to the conducting portion 140.

According to some embodiments, a voltage level (e.g., a ground voltage or a voltage V) may be associated with at least one of the conducting portion 140 and the conducting diaphragm 110. For example, a pressure voltage contact may be connected to the conducting diaphragm 110 and a ground voltage contact may be connected to the conducting portion 140. Moreover, the pressure P may be measured based at least in part on the capacitance between the conducting portion 140 and the conducting diaphragm 110 (e.g., an increase in the pressure P may be associated with an increase in capacitance).

Figure 4:
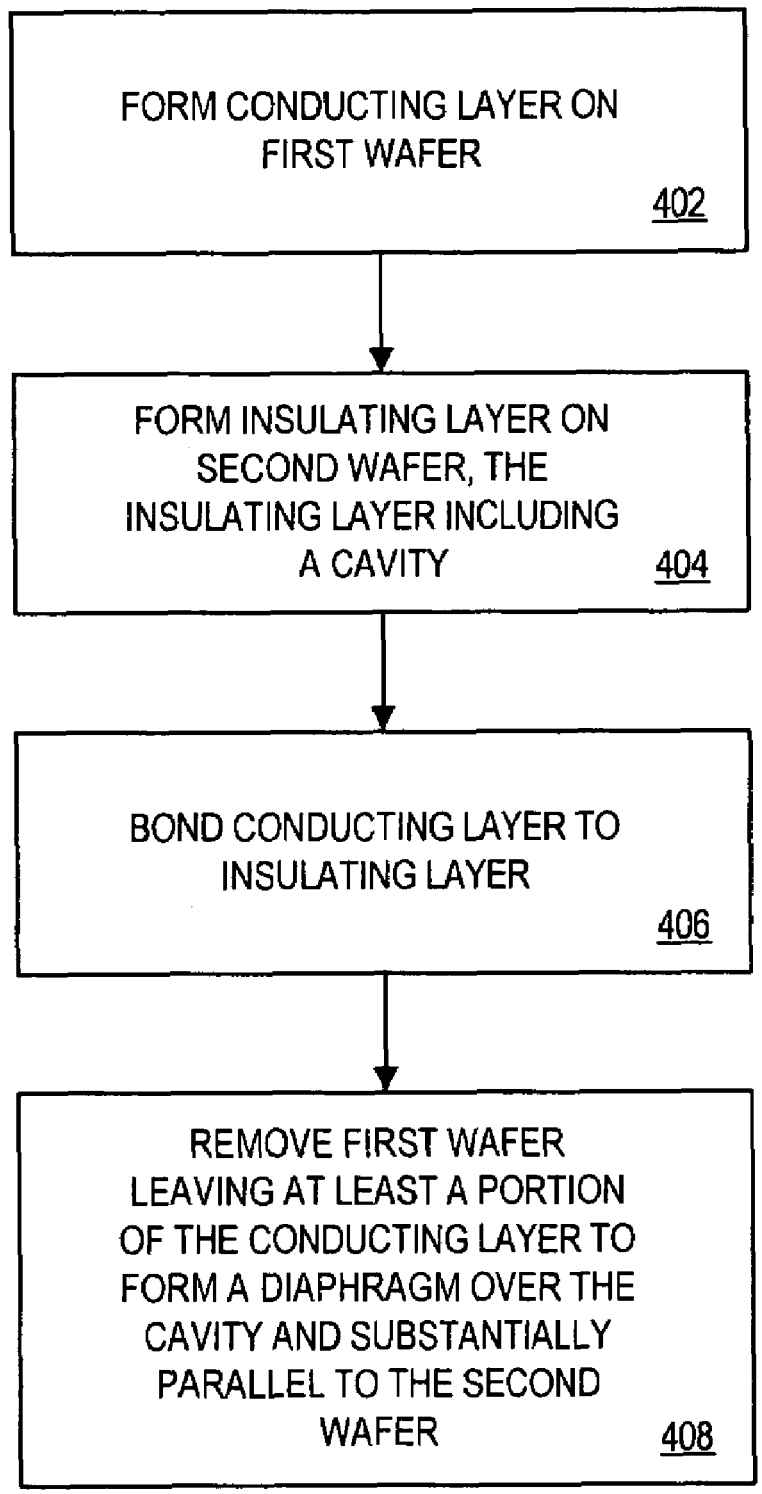
FIG. 4 illustrates a method to create a pressure sensor according to some embodiments.
Figure 5:
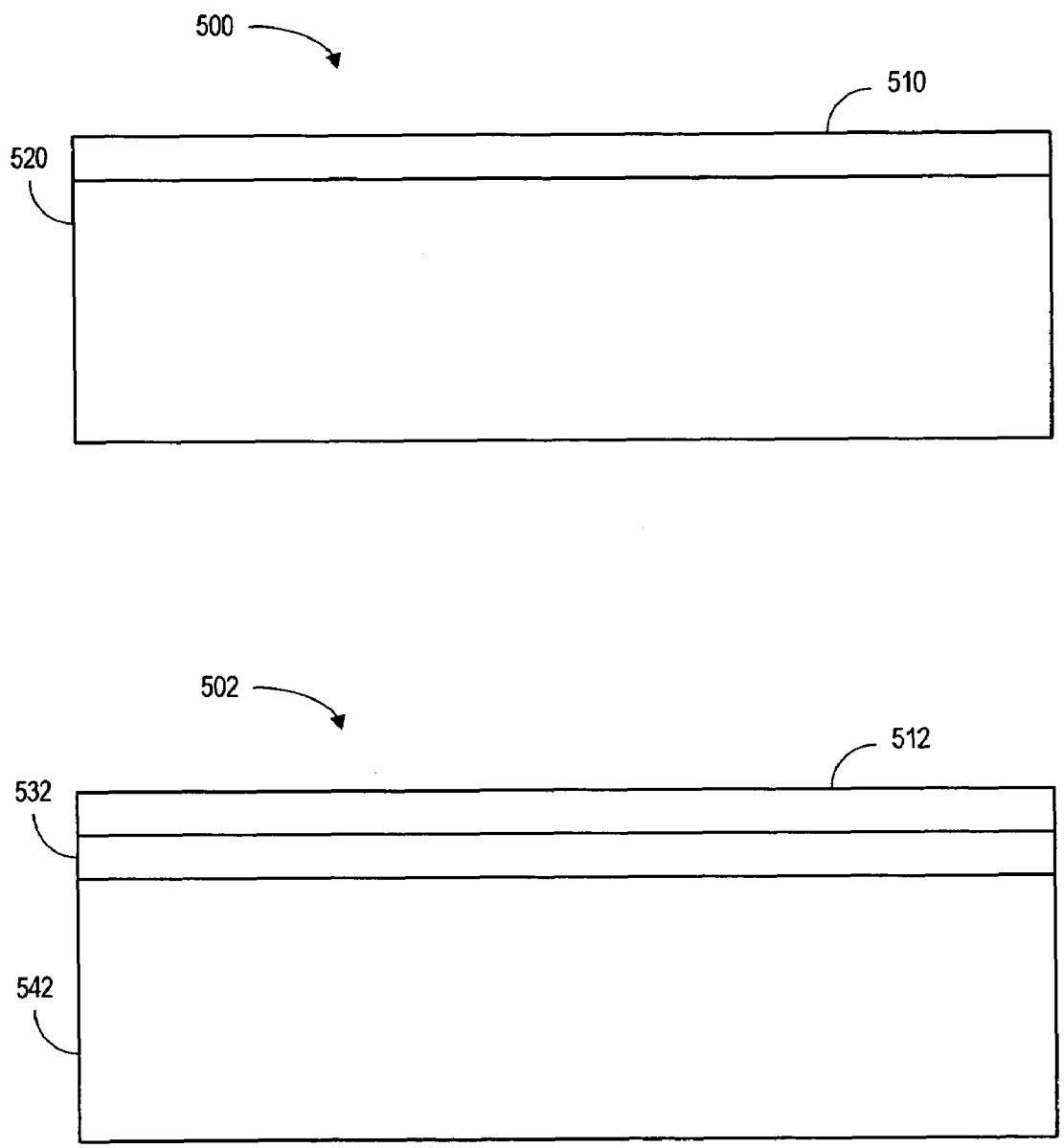
FIGS. 5 through 10 are side views illustrating the construction of a pressure sensor in accordance with an exemplary embodiment of the invention.

FIG. 4 illustrates a method to create a pressure sensor according to some embodiments. At Step 402, a conducting layer is formed on a first wafer. For example, FIG. 5 illustrates a first portion 500 of a pressure sensor that includes a conducting layer 510 formed on a first wafer 520. The first wafer 520 might comprise, for example, a lightly doped silicon wafer. The conducting layer 510 might be formed, for example, by epitaxially growing a highly doped layer on the first wafer 520. According to some embodiments, the surface of the highly doped layer 510 opposite the first wafer 520 is substantially smooth. FIG. 5 also illustrates another embodiment of a first portion 502 which utilizes a highly doped silicon layer of a Silicon On Insulator (SOI) wafer. In particular, this embodiment the first portion 502 may include a thin layer of silicon 512 on a layer of oxide 532, which in turn is bonded to a silicon substrate 542.

Figure 6:
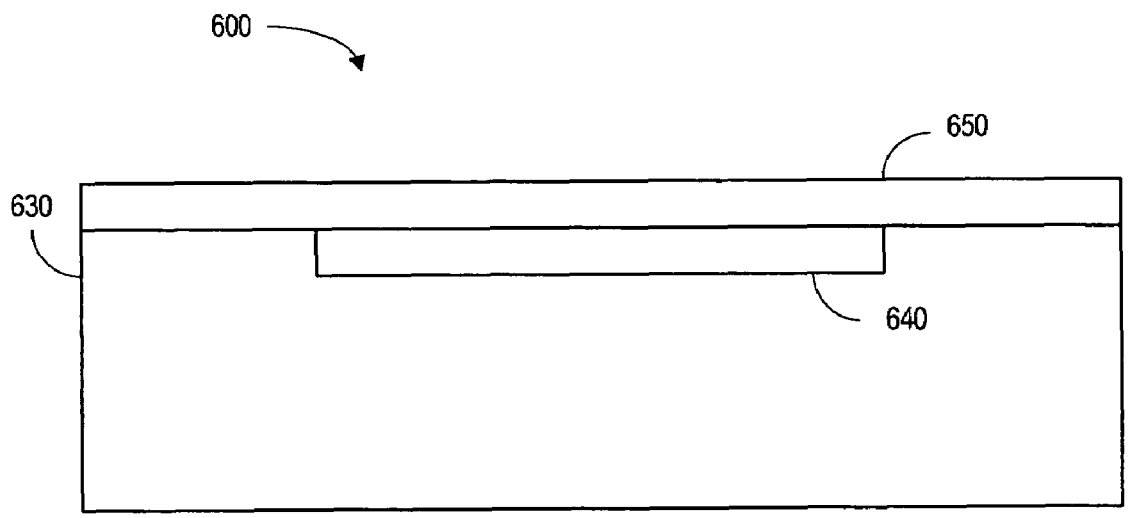

Referring again to FIG. 4, an insulating layer is formed on a second wafer at Step 404. For example, FIG. 6 illustrates a second portion 600 of a pressure sensor that includes an insulating layer 650 formed on a second wafer 630.

The second wafer 630 may be, for example, a silicon wafer or an SOI wafer. Moreover, a conducting area 640 may have been provided in or on the second wafer 630 (e.g., the conducting area 640 might be implanted before the insulating layer 650 was added). When the second wafer 630 is a lightly doped silicon wafer, for example, the conducting area 640 might be a highly doped area created by a suitable mechanism or process, such as, for example, via diffusion or ion bombardment. The second wafer 630 may, according to some embodiments, be a highly doped, conducting silicon wafer.

The insulating layer 650 may be, for example, a layer of oxide that has been deposited or grown on the second wafer 630. According to some embodiments, the surface of the oxide layer 650 opposite the second wafer 630 is substantially smooth.

Figure 7:
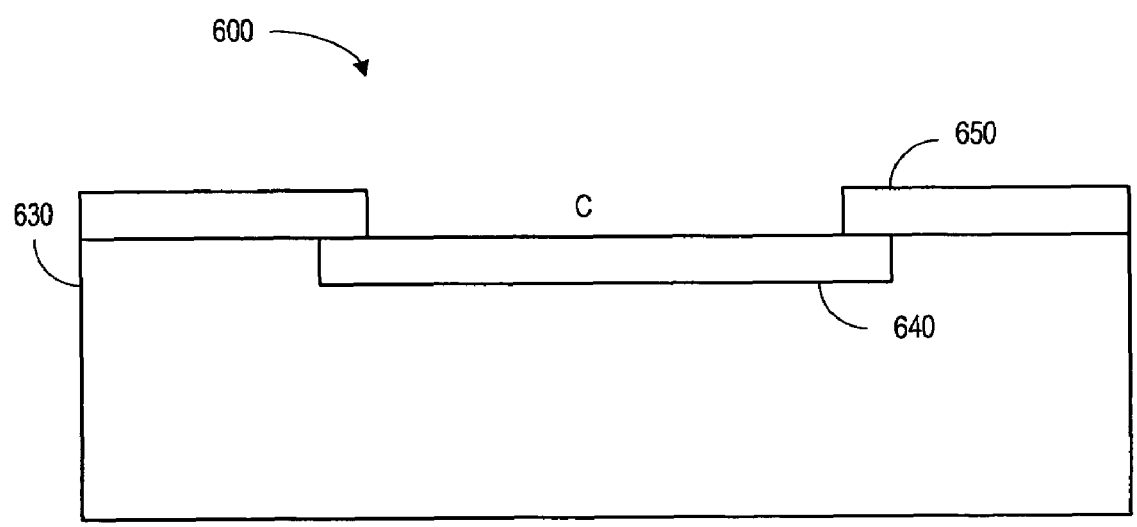

According to some embodiments, a cavity is then created in the insulating layer in an area proximate to the conducting area 640. For example, a pattern mask and a potassium hydroxide wash may be used to form a cavity C as illustrated in FIG. 7. Note that the size of the cavity C might be smaller, larger, or equal to the size of the conducting area 640.

Figure 8:
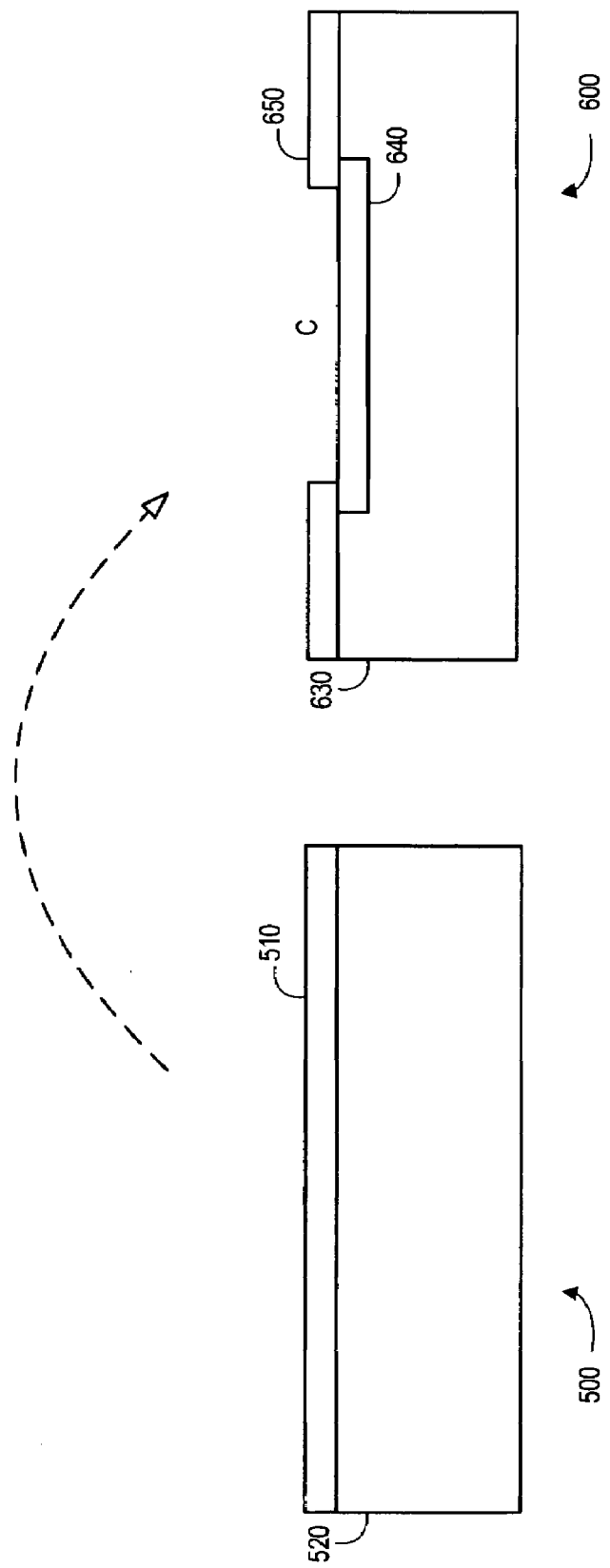

Referring again to FIG. 4, the first portion 500 and the second portion 600 of the sensor may be bonded together at Step 406. In particular, as illustrated in FIG. 8, the surface of the conducting layer 510 opposite the first wafer 520 may be bonded to the surface of the insulating layer 650 opposite the second wafer 630.

Figure 9:
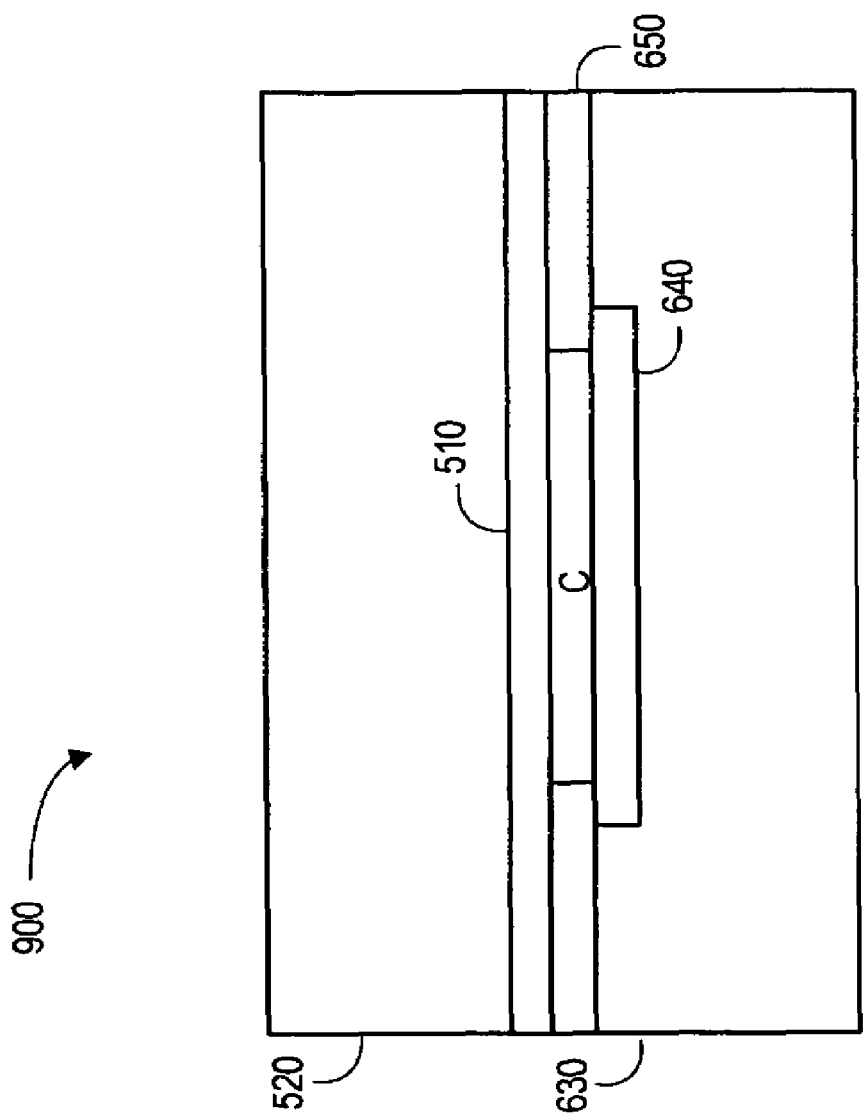

The combined first portion 500 and second portion 600 can then be used to create a pressure sensor 900 as illustrated in FIG. 9. Referring again to FIG. 4, at Step 408 at least a portion of the first wafer 520 is then removed (without removing at least a portion of the conducting layer 510 associated with the cavity C) to form a diaphragm substantially parallel to the second wafer 630.

Figure 10:
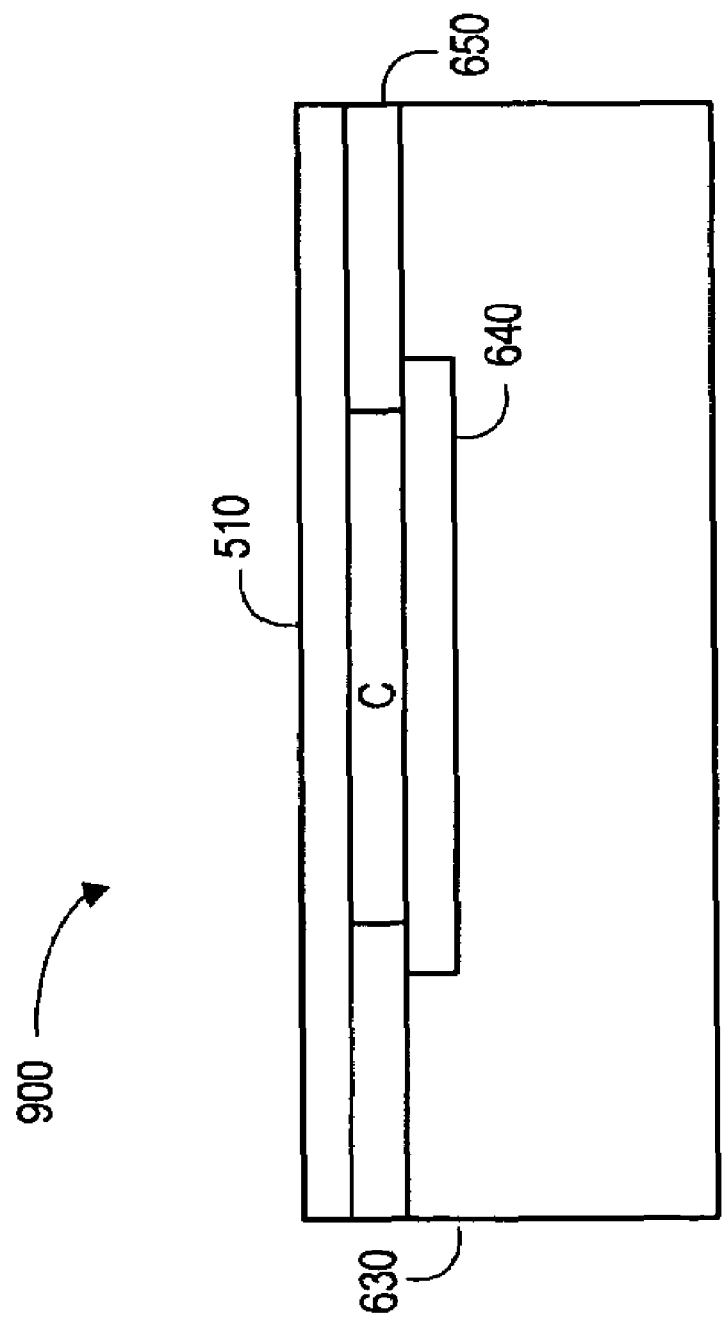

FIG. 10 illustrates the pressure sensor 900 after the first wafer 520 has been completely removed. The sensor 900 may function as a MEMS capacitive pressure sensor because the conducting layer 510 will flex toward the conducting area 640 in response to an external pressure. An increase in pressure, therefore, can be measured based on an increase in capacitance between the conducting layer 510 and the conducting area 640.

Figure 11:
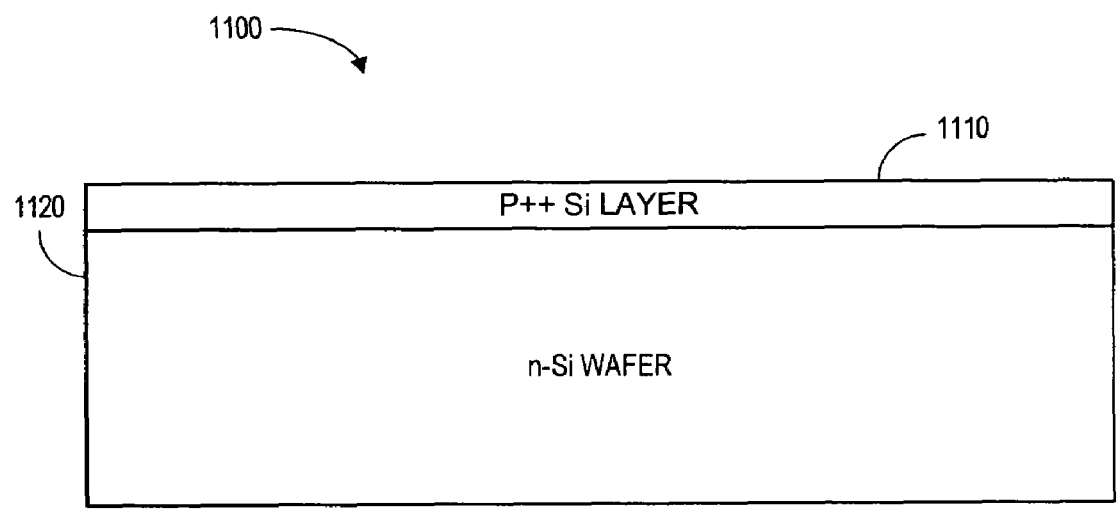
FIGS. 11 through 19 are side views illustrating the construction of a pressure sensor in accordance with another exemplary embodiment of the invention.

FIGS. 11 through 19 are side views illustrating the construction of a pressure sensor in accordance with another exemplary embodiment of the invention. A first portion 1100 of the sensor includes a conducting layer 1110 formed on a first wafer 1120 as illustrated in FIG. 11. The first wafer 1120 is an n-Si wafer and the conducting layer 1110 is a highly doped layer of p++ Si. The conducting layer 1110 may be, for example, approximately 3 µm thick. Moreover, the conducting layer 1110 may be doped with Boron or Boron/Germanium and may have been epitaxially grown on the first wafer 1120. According to some embodiments, the first portion 1100 instead comprises a SOI wafer. Note that steps may be taken to ensure that the surface of the conducting layer 1110 opposite the first wafer 1120 is substantially smooth and flat (e.g., to facilitate bonding).

Figure 12:
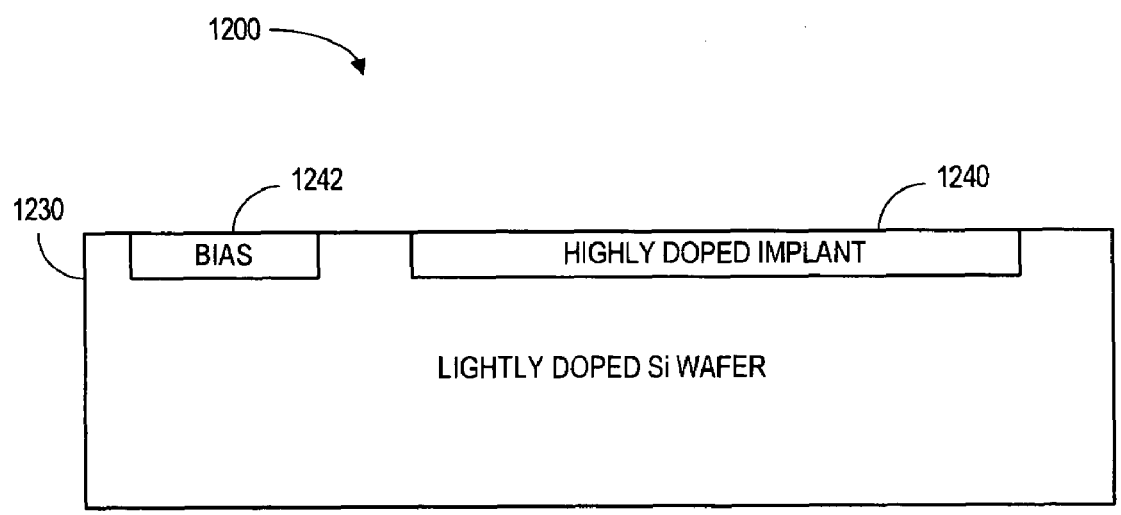

As illustrated in FIG. 12, a second portion 1200 may include a second wafer 1230, such as a standard, n-type lightly doped silicon wafer or an intrinsic wafer. Moreover, a conducting area 1240 is provided in or on the second wafer 1230. The conducting area 1240 may comprise, for example, a p+ or p++ highly doped implant formed using diffusion and/or ion bombardment. Note that as various layers are added to, and removed from, the second portion 1200, steps may be taken to ensure that the top surface of the second portion 1200 remains substantially smooth and flat (e.g., to facilitate bonding with the first portion 1100). For example, it may be difficult to bond the first portion 1100 to the second portion 1200 if the second portion 1200 has become substantially warped.

According to some embodiments, a bias area 1242 is also provided in or on the second wafer 1230. The bias area 1242 may include, for example, an n+ portion that will be used to positively bias the substrate of the second wafer 1230 (e.g., with a potential equal to that which will be applied to a conducting diaphragm). As a result, parasitic capacitance associated with the sensor may be reduced.

Figure 13:
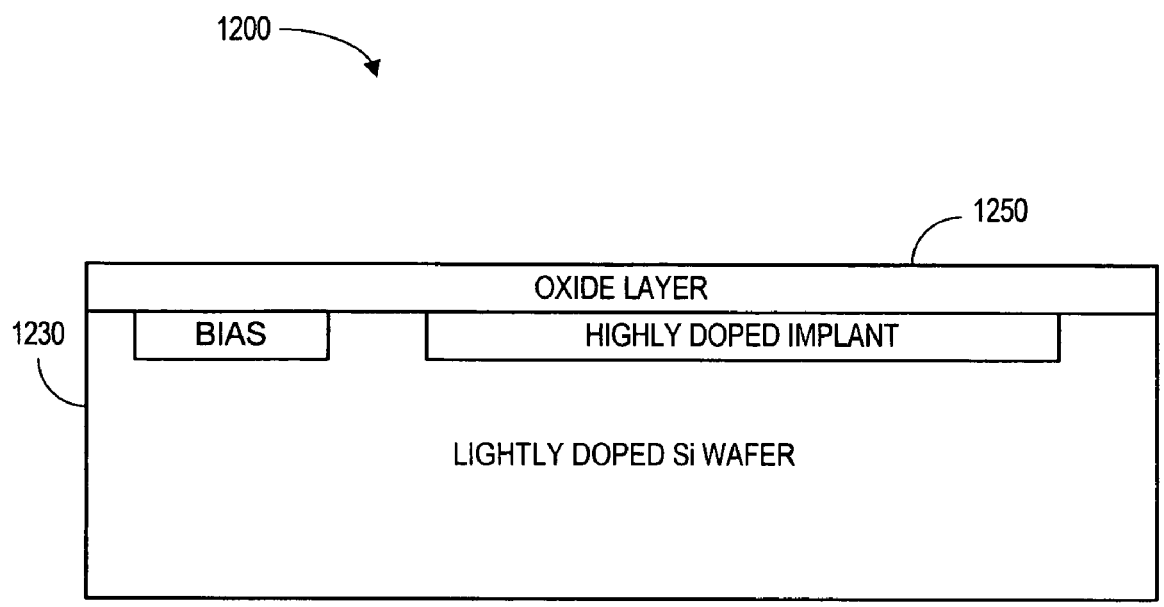

As illustrated in FIG. 13, an insulating layer 1250 is formed on the surface of the second wafer 1230. According to some embodiments, a layer of oxide approximately 3 µm thick may be grown or deposited on the second wafer 1230. By growing the insulating layer 1250 on the second wafer 1230, the thickness of the cavity that is eventually produced can be tightly controlled (e.g., as compared to a well that is created using bulk micromachining).

Figure 14:
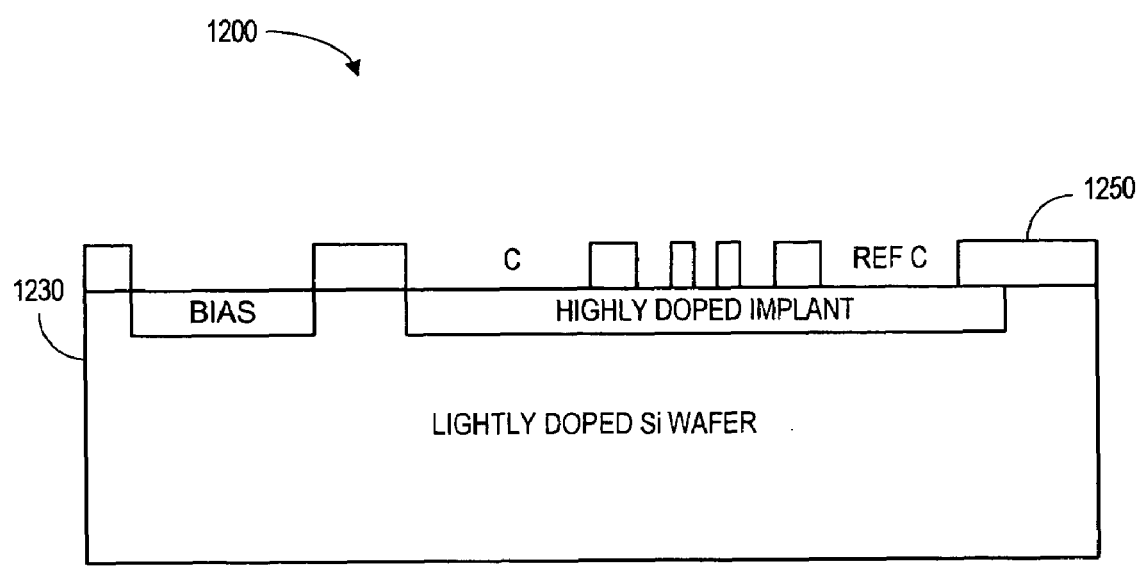

A photo-resist pattern may be used to remove portions of the insulating layer 1250. In particular, a cavity C may be created proximate to the conducting area 1240 of the second wafer 1230 (FIG. 14). In addition, a portion of the insulating layer 1250 may be removed to expose the bias area 1242 of the second wafer 1230. According to some embodiments, other portions of the insulating layer 1250 are removed to create a reference cavity REF C and to expose the conducting area 2140 of the second wafer 1230 (e.g., so that a ground voltage can be provided to the conducting area 2140). According to other embodiments, the insulating layer 1250 is not removed from the reference cavity REF C (in which case the oxide will act as the dielectric for the reference sensor instead of air or a vacuum).

Figure 15:
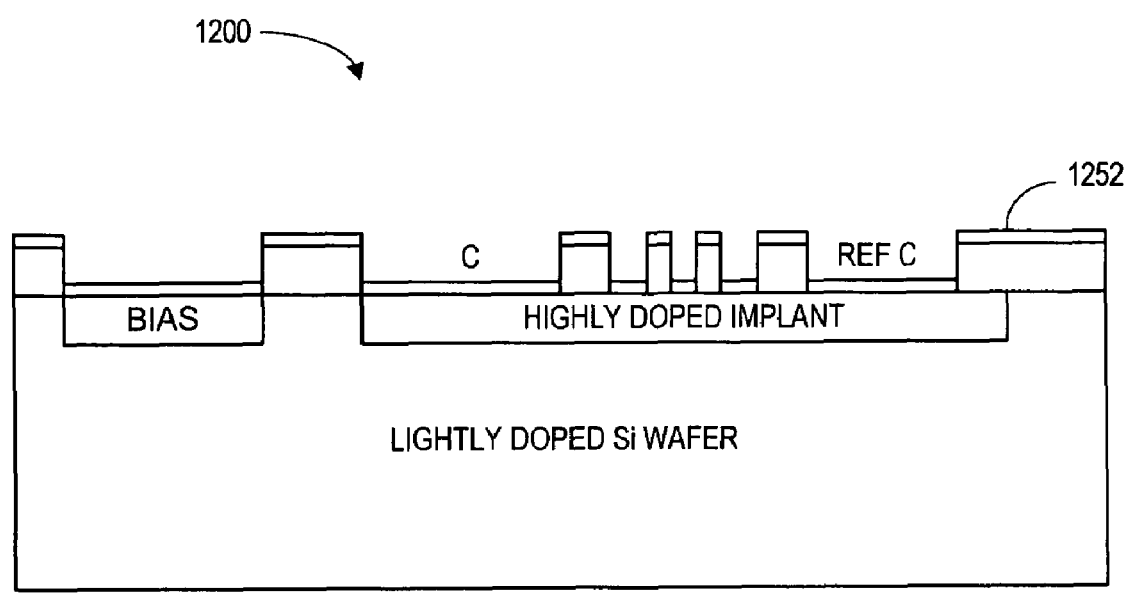

A non-conducting protective layer 1252 may then be provided on the insulating layer 1250 as illustrated in FIG. 15. The protective layer 1252 may be, for example, a 150 nanometer (nm) layer of oxide that is grown or deposited on the second portion 1200. According to some embodiments, the protective layer 1252 may prevent a conducting diaphragm over the cavity C from directly contacting the conducting area 1240 in the second wafer 130 in the event of an overpressure. As will be explained, the protective layer 1252 may also prevent portions of the conducting area 1240 from being inadvertently removed (e.g., as the sensor is being created).

Figure 16:
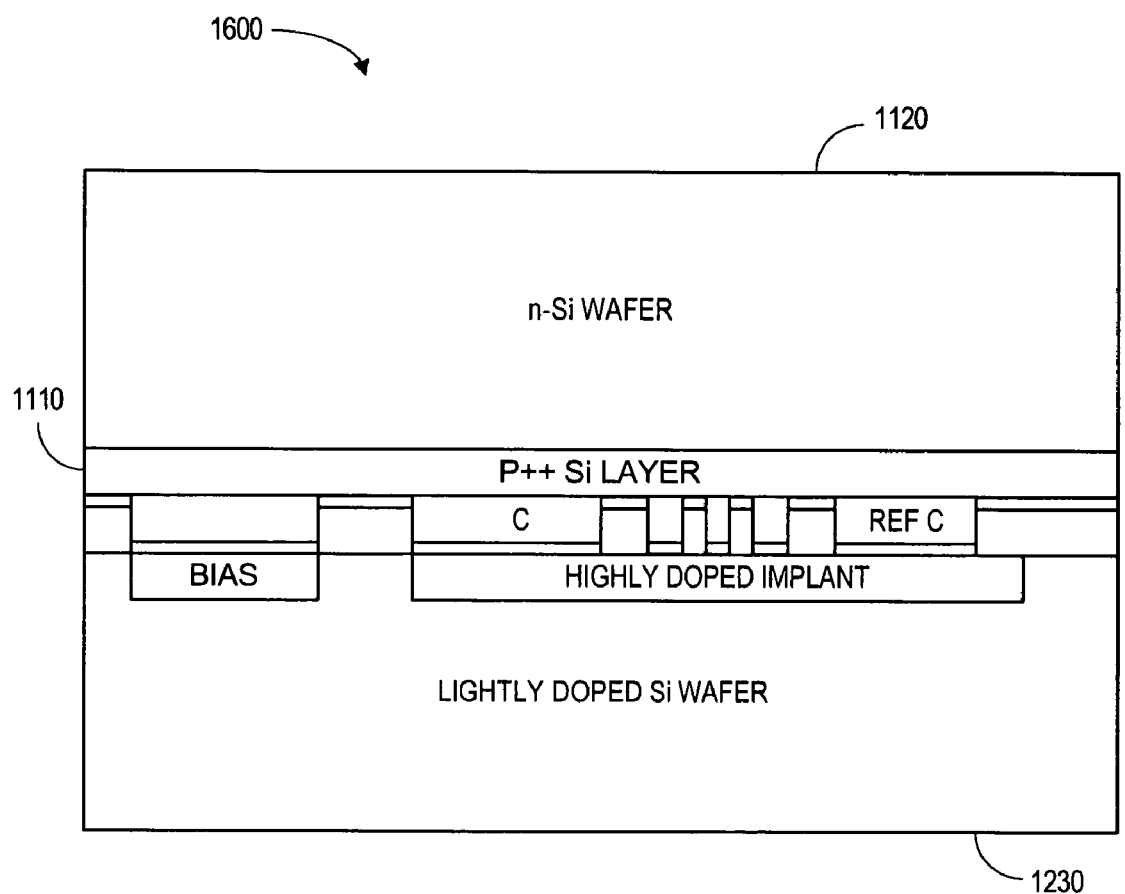

As illustrated in FIG. 16, the conducting layer 1110 of the first portion 1100 may then be bonded to the protective layer 1252 of the second portion 1200 to create a pressure sensor 1600. Note that non-aligned bonding techniques may be used to attach the two portions 1100, 1200.

According to some embodiments, a vacuum is created in the cavity C. For example, the portions 1100, 1200 may be bonded at a low temperature and the temperature may then be increased in a vacuum environment to create a vacuum in the cavity C. According to other embodiments, a pre-determined pressure is sealed into the cavity C (e.g., to produce a gate sensor that determines whether an input pressure exceeds the pre-determined pressure by a threshold amount).

The first wafer 1120 may then be removed. For example, a potassium hydroxide wash may be used to etch away the first wafer 1120. In this case, the p++ Si conducting layer 1110 may automatically stop or slow down the etching process.

Figure 17:
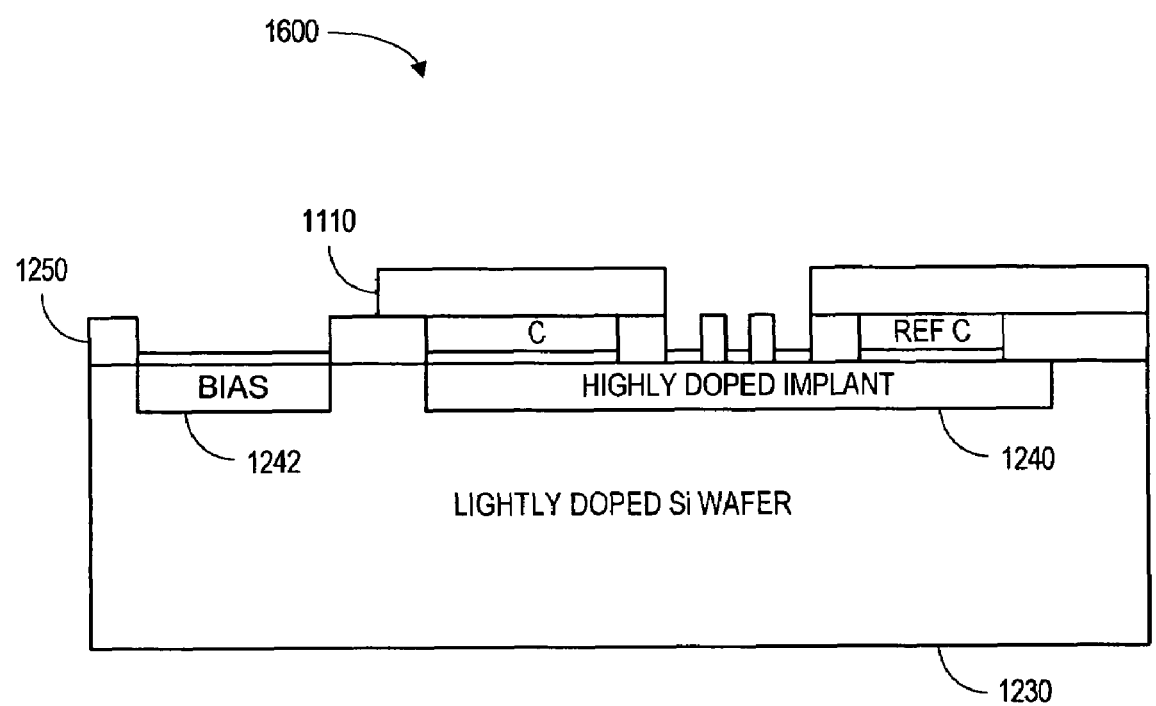

In addition, portions of the conducting layer 1110 may be removed as illustrated in FIG. 17. For example, a mask may be used to pattern the areas to be removed. Note that the protective layer 1252 may prevent the conducting area 1240 and the bias area 1242 from being inadvertently removed.

Figure 18:
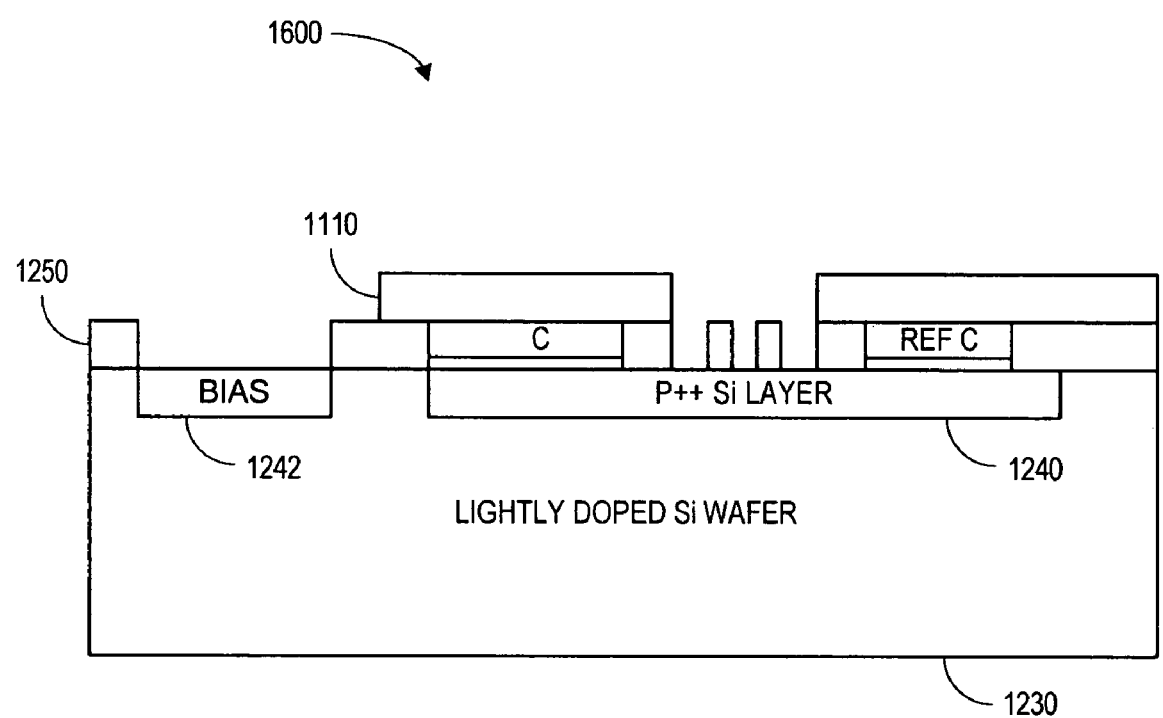

A short oxide etch may then be performed on the sensor 1600 to remove the protective layer 1242 from certain areas as illustrated in FIG. 18. Note that the conducting diaphragms may prevent the protective layer 1252 from being removed inside the cavity C and the reference cavity REF C.

Figure 19:
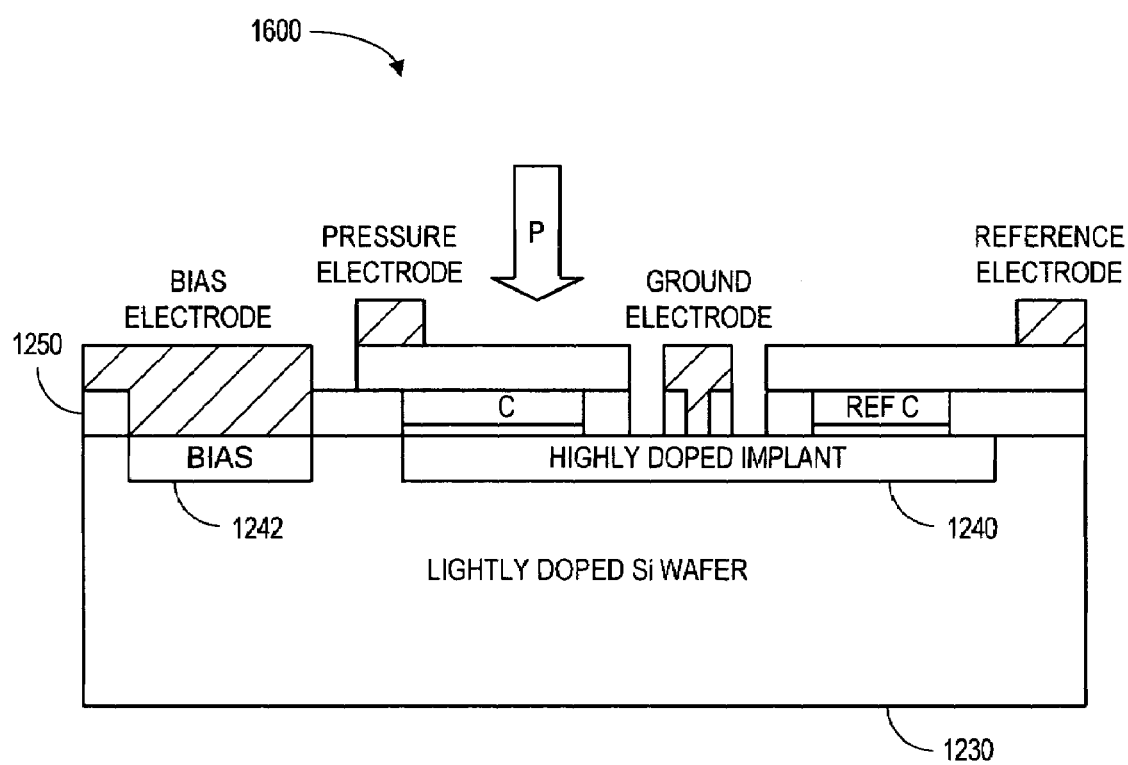

As illustrated in FIG. 19, a metallic deposit and mask may be used to create: (i) a pressure electrode contacting the diaphragm over the cavity C, (ii) a reference electrode contacting the diaphragm over the reference cavity REF C, (iii) a ground electrode contacting the conducting areas 1240 under the cavity C and the reference cavity REF C, and (iv) a bias electrode to provide a potential to the substrate of the second wafer 1230.

Figure 20:
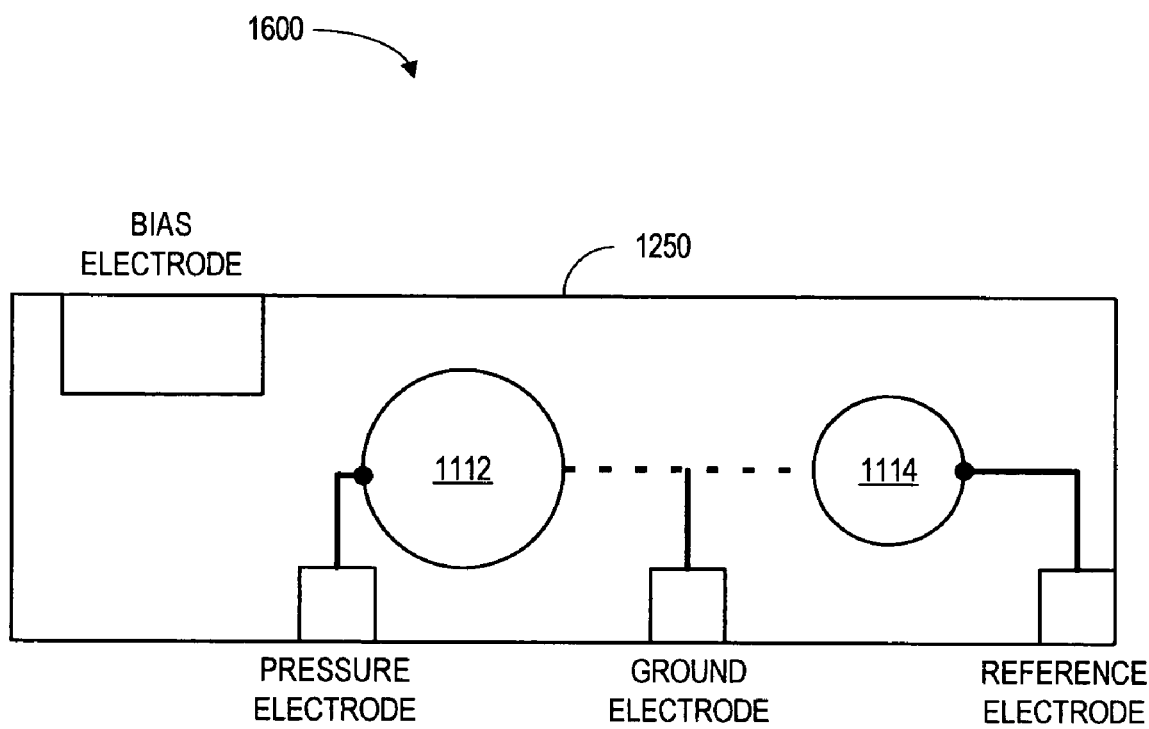
FIG. 20 is a top view of a pressure sensor in accordance with an exemplary embodiment of the invention.

FIG. 20 is a top view of the pressure sensor 1600 in accordance with an exemplary embodiment of the invention. The pressure electrode and the ground electrode may be used to determine any change in capacitance between the conducting diaphragm 1112 and the conducting area 1240 under the cavity C. That is, a change in capacitance may be detected and used to determine a change in pressure to which the conducting diaphragm 1112 is being exposed. Note that any technique might be used to measure an amount of and/or a change in capacitance. For example, a change in capacitance might be converted into a voltage that can be measured and/or approaches using Alternating Current (AC) could be implemented.

The reference electrode and the ground electrode may be used to determine any change in capacitance between the reference diaphragm 1114 and the conducting area 1240 under the reference cavity REF C. The reference cavity REF C may, for example, be used to help determine when a change in capacitance associated with the conducting diaphragm 1112 is due to a change in temperature and humidity as opposed to a change in pressure. Note that the reference cavity REF C may be smaller than, larger than, or the same size as the cavity C. For example, when air is the dielectric for the cavity C and oxide is the dielectric for the reference cavity REF C, the reference cavity REF C might be smaller than the cavity C (e.g., because oxide has a higher dielectric constant than air).

Figure 21:
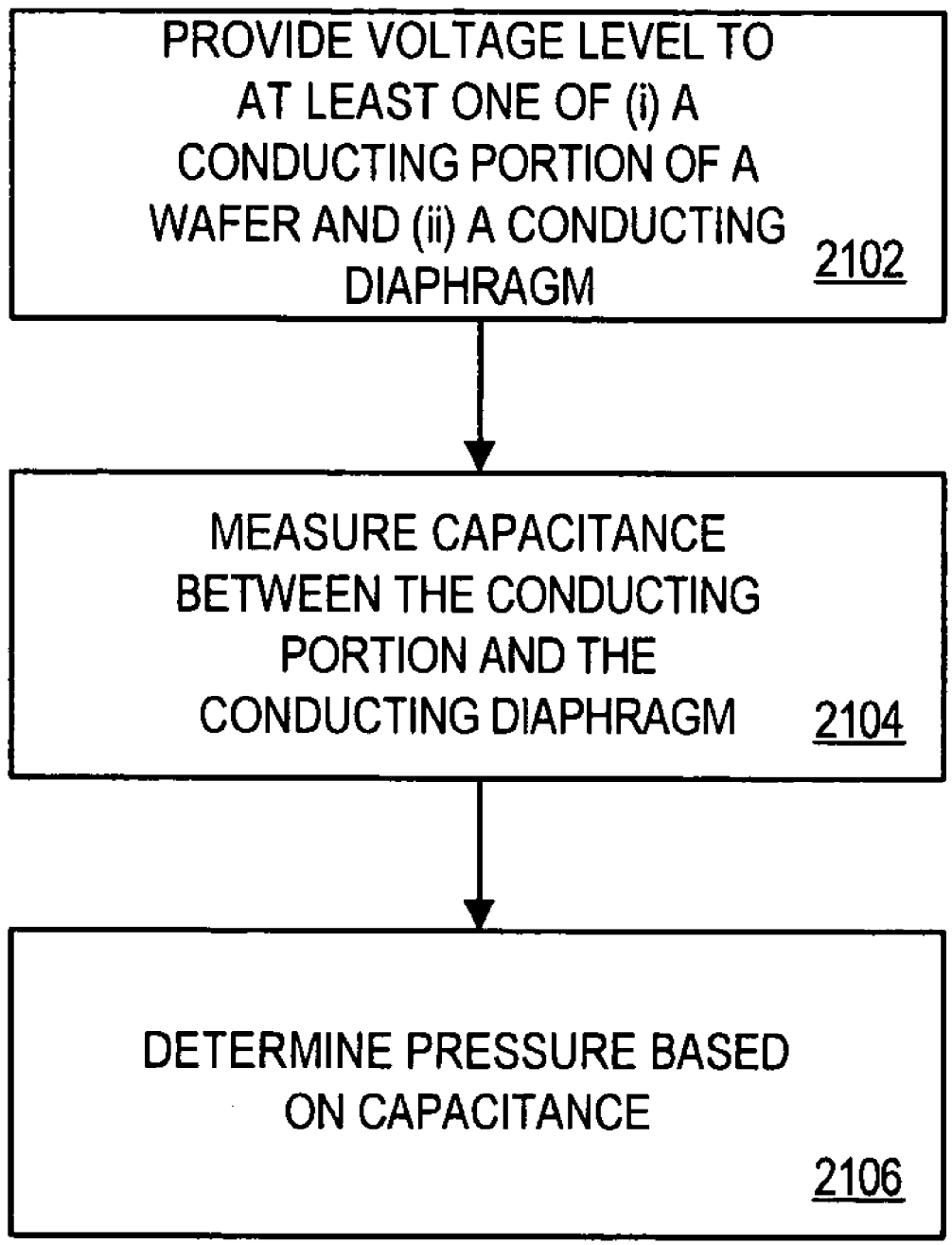
FIG. 21 illustrates a method to measure pressure according to some embodiments.

FIG. 21 illustrates a method to measure pressure according to some embodiments. At Step 2102, a voltage level is provided to at least one of (i) a conducting portion of a wafer and (ii) a conducting diaphragm in accordance with any of the embodiments described herein. For example, the conducting portion may be associated with a wafer having a substantially flat surface defining a plane. Moreover, the wafer may have an insulating layer on the surface, and the insulating layer may include a cavity proximate to the conducting portion. The conducting diaphragm may be bonded to the insulating layer to cover the cavity and may be substantially parallel to the plane defined by the surface of the wafer.

At Step 2104, the capacitance between the conducting portion and the conducting diaphragm is measured. At Step 2106, an amount of pressure is determined based on the capacitance measured at Step 2104.

Thus, some embodiments may provide a MEMS sensor that is accurate and inexpensive to produce (e.g., because the thicknesses of the diaphragms and cavities can be accurately defined and controlled by growing layers on silicon wafers).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Some embodiments have been described herein with respect to an absolute pressure sensor, but embodiments may be used in connection with a gauge or differential pressure sensor. For example, a first pressure P1 may be applied to the outer surface of the conducting diaphragm. Moreover, a passage may be provided into the cavity C through which a second pressure P2 is introduced. In this case, a change in capacitance would be associated with a difference between the two pressures P1, P2. According to another embodiment, a low doped layer is patterned with a conducting layer on the side opposite the cavity C (e.g., which may lower parasitics).

Figure 22:
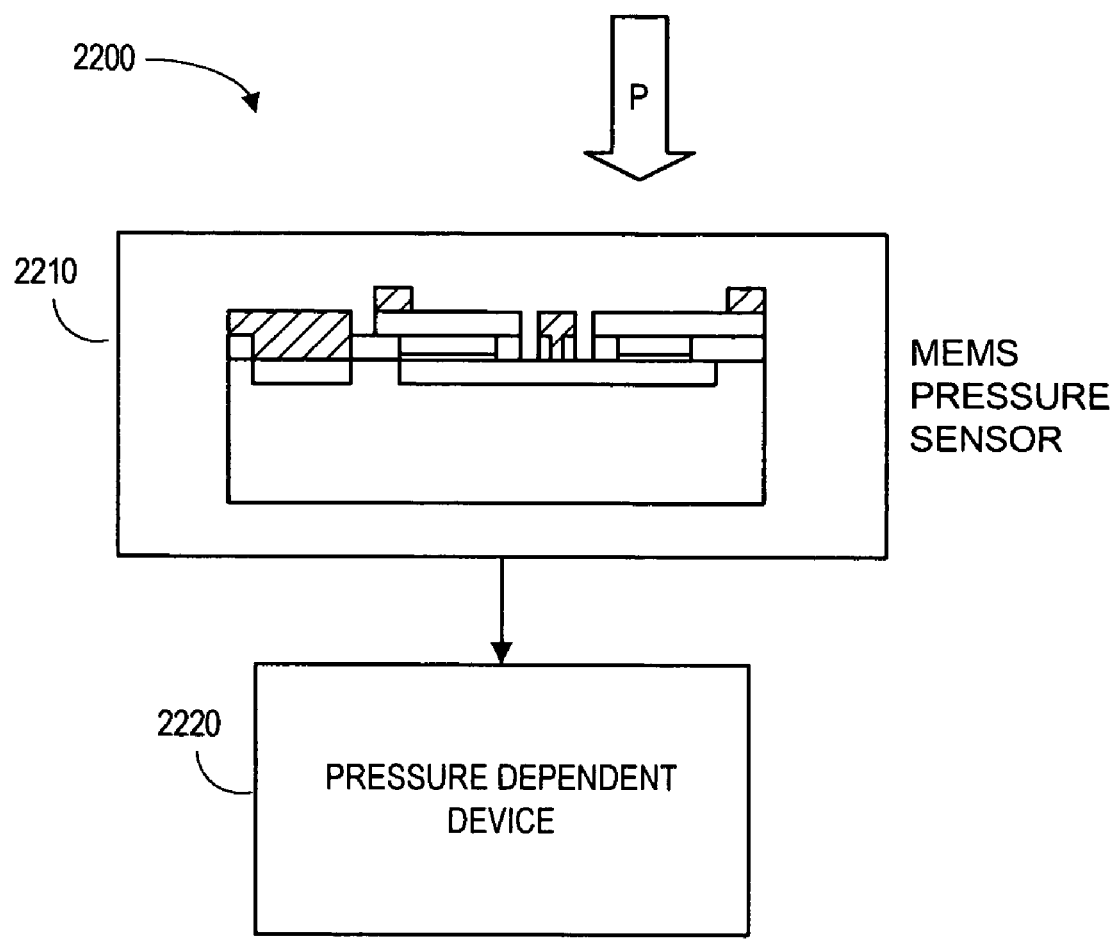
FIG. 22 is a system constructed in accordance with another exemplary embodiment of the invention.

While embodiments have been described with respect to pressure sensors, note that any of the embodiments may be associated with a system that uses a pressure sensor. For example, FIG. 22 is a system 2200 constructed in accordance with another exemplary embodiment of the invention. The system 2200 includes a MEMS pressure sensor 2210 that operates in accordance with any of the embodiments described herein. For example, the MEMS pressure sensor 2210 might include an apparatus such as the one illustrated in FIGS. 19 and 20.

Information from the MEMS pressure sensor 2210 is provided to a pressure dependent device 2220 (e.g., via an electrical signal). The pressure dependent device 2220 might be, for example, associated with a pressure display, a pressure monitor, an engine or automotive device (e.g., a tire pressure monitor), an ultrasonic transducer, a medical device (e.g., a blood pressure sensor), and/or a barometer.

In addition, although some embodiments have been described with respect to the use of a capacitance value to sense an amount of pressure, embodiments might be associated with other types of displacement, sensing techniques. For example, the deformable, conducting diaphragms described in any of the embodiments described herein may be replaced with diaphragms that have piezoelectric and/or piezoresistance characteristics (or devices having such characteristics may be embedded into or onto the diaphragms). According to this embodiment, an amount of resistance associated with the diaphragm will vary depending on an amount of stress. As a result, the resistance may be measured and used to determine a corresponding amount of pressure (e.g., an increase in pressure will cause the diaphragm to flex more and thus change the resistance). Note that according to this embodiment, the diaphragm may or may not be conductive. According to some embodiments, changes in both capacitance and resistance are used to determine an amount of pressure.

Further, although particular layouts and manufacturing techniques have been described herein, embodiments may be associated with other layouts and/or manufacturing techniques. For example, cap wafers with pressure and/or electrical ports may be provided for any of the embodiments described herein. Such wafers may, for example, be used to interface with an Application Specific Integrated Circuit (ASIC) device.

Some embodiments described herein have included a conducting portion 140 embedded in or on wafer 130. Note however, that the entire wafer 130 might act as the conducting portion (e.g., a highly doped silicon layer from a SOI wafer).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A sensor apparatus, comprising:
a wafer having a substantially flat surface defining a plane and lacking a cavity;
an insulating layer on the surface of the wafer, the insulating layer including a cavity and a reference capacitor spaced apart from said cavity, said reference capacitor being unaffected by a pressure change;
a bias area associated with the wafer and disposed apart from the conducting portion:
a conducting portion associated with the wafer and proximate to the cavity such that the conducting portion is not in direct contact with the insulating layer; and
a conducting diaphragm bonded to the insulating layer, wherein the conducting diaphragm covers the cavity and is substantially parallel to the plane.

2. The apparatus of claim 1, wherein the wafer is a lightly doped silicon wafer and the conducting portion comprises a highly doped conducting area.

3. The apparatus of claim 1, wherein the conducting diaphragm is deformable in a direction substantially normal to the plane.

4. The apparatus of claim 3, wherein the conducting portion and the conducting diaphragm are electrically isolated from each other, and a pressure is to be measured based at least in part on capacitance between the conducting portion and the conducting diaphragm.

5. The apparatus of claim 4, wherein a voltage level is associated with at least one of the conducting portion and the conducting diaphragm.

6. The apparatus of claim 5, wherein an increase in pressure is associated with an increase in capacitance.

7. The apparatus of claim 1, further comprising:
a non-conducting protective layer on the conducting portion.

8. The apparatus of claim 1, further comprising at least one of: (i) a pressure electrode, (ii) a ground electrode, (iii) a reference electrode, or (iv) a bias electrode.

9. A pressure sensor, comprising:
a lightly doped silicon wafer having a substantially flat surface defining a plane and lacking a cavity;
an insulating layer formed on the surface of the silicon wafer, the insulating layer including a cavity and a reference capacitor spaced apart from said cavity, said reference capacitor being unaffected by a pressure change;
a bias implant area in the silicon wafer in an area spaced apart from the conductive implant area;
a highly doped conductive implant area in the silicon wafer in an area proximate to the cavity, wherein the insulating layer is not in direct contact with the highly doped conductive implant area;
a conducting diaphragm bonded to the insulating layer, wherein the conducting diaphragm covers the cavity and is substantially parallel to the plane; and
a device to measure capacitance between the implant area and the conducting diaphragm.

10. A system, comprising:
a microelectromechanical system pressure sensor, including:
a wafer having a substantially flat surface defining a plane and lacking a cavity,
an insulating layer on the surface of the wafer, the insulating layer including a cavity and a reference capacitor spaced apart from said cavity, said reference capacitor being unaffected by a pressure change,
a bias area associated with the wafer and disposed apart from the conducting portion;
a conducting portion associated with the wafer and proximate to the cavity such that the conducting portion is not in direct contact with the insulating layer, and
a conducting diaphragm bonded to the insulating layer, wherein the conducting diaphragm covers the cavity and is substantially parallel to the plane; and
a pressure dependent device.

11. The system of claim 10, wherein the pressure dependent device is associated with at least one of: (i) a pressure display, (ii) a pressure monitor, (iii) an ultrasonic transducer, (iv) a medical device, and (v) a barometer.

* * * * *

UNITED STATES PATENT AND TRADEMARK OFFICE
CERTIFICATE OF CORRECTION

PATENT NO. : 7,560,788 B2 Page 1 of 1
APPLICATION NO. : 10/945399
DATED : July 14, 2009
INVENTOR(S) : Fortin et al.

It is certified that error appears in the above-identified patent and that said Letters Patent is hereby corrected as shown below:

In Column 6, Line 44, delete "displacement," and insert -- displacement --, therefor.

In Column 7, Line 20, in Claim 1, delete "portion:" and insert -- portion; --, therefor.

Signed and Sealed this

First Day of September, 2009

David J. Kappos
*Director of the United States Patent and Trademark Office*